US009070363B2

(12) United States Patent
Waibel et al.

(10) Patent No.: US 9,070,363 B2
(45) Date of Patent: Jun. 30, 2015

(54) SPEECH TRANSLATION WITH BACK-CHANNELING CUES

(75) Inventors: Alexander Waibel, Murrysville, PA (US); Ian R. Lane, Pittsburgh, PA (US)

(73) Assignee: Facebook, Inc., Menlo Park, CA (US)

( * ) Notice: Subject to any disclaimer, the term of this patent is extended or adjusted under 35 U.S.C. 154(b) by 724 days.

(21) Appl. No.: 12/689,042

(22) Filed: Jan. 18, 2010

(65) Prior Publication Data

US 2010/0217582 A1 Aug. 26, 2010

Related U.S. Application Data

(63) Continuation-in-part of application No. 12/424,311, filed on Apr. 15, 2009, now Pat. No. 8,204,739, and a continuation-in-part of application No. 11/925,048, filed on Oct. 26, 2007, now Pat. No. 8,090,570.

(51) Int. Cl.
| | |
|---|---|
| *G10L 21/00* | (2013.01) |
| *G10L 25/00* | (2013.01) |
| *G10L 15/06* | (2013.01) |
| *G06F 17/28* | (2006.01) |
| *G10L 15/22* | (2006.01) |
| *G10L 13/00* | (2006.01) |
| *G10L 15/26* | (2006.01) |

(52) U.S. Cl.
CPC ............ *G10L 15/06* (2013.01); *G06F 17/2809* (2013.01); *G06F 17/2818* (2013.01); *G10L 15/063* (2013.01); *G10L 15/22* (2013.01); *G10L 2015/0631* (2013.01); *G10L 13/00* (2013.01); *G10L 15/26* (2013.01)

(58) Field of Classification Search
CPC ............................ G06F 17/289; G10L 15/265
USPC ................................................ 704/1–10, 277
See application file for complete search history.

(56) References Cited

U.S. PATENT DOCUMENTS

| | | | |
|---|---|---|---|
| 5,268,839 A | 12/1993 | Kaji | |
| 5,855,000 A | 12/1998 | Waibel et al. | |
| 5,987,402 A | 11/1999 | Murata et al. | |
| 5,995,935 A | 11/1999 | Hagiwara et al. | |
| 6,006,221 A | 12/1999 | Liddy et al. | |
| 6,085,162 A | 7/2000 | Cherny | |
| 6,104,989 A | 8/2000 | Kanevsky et al. | |
| 6,144,938 A | 11/2000 | Surace et al. | |
| 6,148,105 A | 11/2000 | Wakisaka et al. | |
| 6,219,646 B1 | 4/2001 | Cherny | |
| 6,223,150 B1 | 4/2001 | Duan et al. | |
| 6,243,669 B1 * | 6/2001 | Horiguchi et al. ................ 704/9 |
| 6,246,976 B1 | 6/2001 | Mukaigawa et al. | |
| 6,278,968 B1 | 8/2001 | Franz et al. | |
| 6,282,504 B1 | 8/2001 | Wong et al. | |
| 6,292,769 B1 | 9/2001 | Flanagan et al. | |
| 6,339,754 B1 | 1/2002 | Flanagan et al. | |
| 6,356,865 B1 * | 3/2002 | Franz et al. ....................... 704/2 |
| 6,374,224 B1 | 4/2002 | Horiguchi et al. | |
| 6,438,524 B1 | 8/2002 | Shi | |
| 6,442,524 B1 | 8/2002 | Ecker et al. | |
| 6,584,439 B1 | 6/2003 | Geilhufe et al. | |
| 6,697,777 B1 * | 2/2004 | Ho et al. ........................ 704/235 |
| 6,742,047 B1 | 5/2004 | Tso | |
| 6,901,367 B1 | 5/2005 | Berstis et al. | |
| 6,917,920 B1 | 7/2005 | Koizumi et al. | |
| 6,941,269 B1 * | 9/2005 | Cohen et al. .................. 704/275 |
| 6,996,520 B2 | 2/2006 | Levin | |
| 6,999,932 B1 | 2/2006 | Zhou | |
| 7,016,849 B2 | 3/2006 | Arnold et al. | |
| 7,069,222 B1 | 6/2006 | Borquez et al. | |
| 7,539,619 B1 | 5/2009 | Seligman et al. | |
| 7,542,908 B2 | 6/2009 | Segond et al. | |
| 7,552,053 B2 | 6/2009 | Gao et al. | |
| 7,593,842 B2 | 9/2009 | Rousseau | |
| 7,668,718 B2 | 2/2010 | Kahn et al. | |
| 7,711,570 B2 | 5/2010 | Galanes et al. | |
| 7,730,764 B2 | 6/2010 | Tachibana et al. | |
| 7,752,031 B2 | 7/2010 | Childress et al. | |
| 7,921,018 B2 | 4/2011 | Hong et al. | |
| 7,970,598 B1 | 6/2011 | Flanagan et al. | |
| 8,204,739 B2 | 6/2012 | Waibel et al. | |
| 2001/0029455 A1 | 10/2001 | Chin et al. | |
| 2002/0169592 A1 | 11/2002 | Aityan | |
| 2002/0198713 A1 | 12/2002 | Franz et al. | |
| 2003/0009320 A1 * | 1/2003 | Furuta ............................ 704/2 |
| 2003/0115059 A1 | 6/2003 | Jayaratne | |
| 2005/0119884 A1 | 6/2005 | Breuer | |
| 2005/0131673 A1 * | 6/2005 | Koizumi et al. .................. 704/2 |

(Continued)

FOREIGN PATENT DOCUMENTS

| | | |
|---|---|---|
| EP | 0 773 532 A2 | 5/1997 |
| JP | H08-212216 | 8/1996 |
| JP | 2006-318202 A | 11/2006 |

OTHER PUBLICATIONS

Ward, Nigel, and Wataru Tsukahara. "Prosodic features which cue back-channel responses in English and Japanese." Journal of pragmatics 32.8 (2000): 1177-1207.*
Ward, Nigel. "Using prosodic clues to decide when to produce back-channel utterances." Spoken Language, 1996. ICSLP 96. Proceedings., Fourth International Conference on. vol. 3. IEEE, 1996.*
Benus, Stefan, Agustin Gravano, and Julia Bell Hirschberg. "The prosody of backchannels in American English." (2007).*
Noguchi, Hiroaki, and Yasuharu Den. "Prosody-based detection of the context of backchannel responses." ICSLP. 1998.*

(Continued)

*Primary Examiner* — Shaun Roberts
(74) *Attorney, Agent, or Firm* — Fenwick & West LLP

(57) ABSTRACT

A field maintainable class-based translation system and apparatus with components that ease use by linguistically untrained users is disclosed. The apparatus includes modules for recovering errors, extending and customizing language coverage and increasing the speed of effective communication.

25 Claims, No Drawings

(56) References Cited

U.S. PATENT DOCUMENTS

| | | | |
|---|---|---|---|
| 2005/0144012 A1 | 6/2005 | Afrashteh et al. | |
| 2005/0203738 A1 | 9/2005 | Hwang | |
| 2005/0228641 A1 | 10/2005 | Chelba et al. | |
| 2007/0016401 A1 | 1/2007 | Ehsani et al. | |
| 2007/0100814 A1 | 5/2007 | Lee et al. | |
| 2007/0150257 A1 | 6/2007 | Cancedda et al. | |
| 2007/0179779 A1* | 8/2007 | Kagoshima et al. | 704/10 |
| 2008/0103769 A1 | 5/2008 | Schultz et al. | |
| 2008/0120091 A1 | 5/2008 | Waibel et al. | |
| 2008/0126087 A1 | 5/2008 | Chou | |
| 2008/0254821 A1 | 10/2008 | Kusada et al. | |
| 2009/0281789 A1 | 11/2009 | Waibel et al. | |
| 2010/0217582 A1 | 8/2010 | Waibel et al. | |

OTHER PUBLICATIONS

Fujie, Shinya, Kenta Fukushima, and Tetsunori Kobayashi. "A conversation robot with back-channel feedback function based on linguistic and nonlinguistic information." Proc. ICARA Int. Conference on Autonomous Robots and Agents. 2004.*

Bertrand, Roxane, et al. "Backchannels revisited from a multimodal perspective." Proceedings of Auditory-visual Speech Processing. 2007.*

Cathcart, Nicola, Jean Carletta, and Ewan Klein. "A shallow model of backchannel continuers in spoken dialogue." Proceedings of the tenth conference on European chapter of the Association for Computational Linguistics—vol. 1. Association for Computational Linguistics, 2003.*

M. Hsieh et al., "Combining lexical, syntactic and prosodic cues for improved online dialog act tagging," Computer Speech and Language 23 (2009) pp. 407-422.

H. Niemann et al., "Using Prosodic Cues in Spoken Dialog Systems," Proc. of SPECOM '98 Workshop, 1998, pp. 17-28.

D. Litman et al., "Predicting Automatic Speech Recognition Performance Using Prosodic Cues," Proc. NAACL 2000, pp. 218-225.

P. Aguero et al., "Prosody Generation for Speech-to-Speech Translation," Int. Conf. Acoust. Speech Signal Process. pp. I-557-I-560 (2006).

Korean Intellectual Property Office, Office Action, Korean Patent Application No. 10-2010-7025487, Apr. 26, 2014, eight pages.

Arbabi et al., "Algorithms for Arabic Name Transliteration," *IBM J. Res. Develop.*, Mar. 1994, vol. 38, No. 2.

Bach et al., "The CMU TRANSTAC 2007 Eyes-Free and Hands-Free Two-Way Speech-To-Speech Translation System," Interact, Language Technologies Institute, Carnegie Mellon University, 2007.

Brown et al., "The Mathmatics of Statistical Machine Translation: Parameter Estimation," Association for Computational Linguistics, 1993.

Chiang et al., "The Hiero Machine Translation System: Extensions, Evaluation, and Analysis," *Proc. of Human Language Technology Conference on Empirical Methods in Natural Language Processing*, Oct. 2005, pp. 779-786.

European Patent Office, Examination Report, European Patent Application No. 09732921.3, Sep. 9, 2013, five pages.

Fugen et al., "LingWear: A Mobile Tourist Information System," *Proc. of Human Language Technology Conference*, San Diego, CA 2001.

Fugen et al, "Open Domain Speech Translation: From Seminars and Speeches to Lectures," *TC-Star Workshop on Speech-to-Speech Translation*, Jun. 19-21, 2006, Barcelona Spain, pp. 81-86.

Fugen et al., "Advances in Lecture Recognition: The ISL RT-06S Evaluation System," *INTERSPEECH 2006*.

Fugen et al., "Open Domain Speech Translation: From Seminars and Speeches to Lectures," *ICASSP*, Toulouse, France 2006.

Gales, "Maximum Likelihood Multiple Projection Schemes for Hidden Markov Models," 2000 (abstract).

Gales, "Semi-Tied Covariance Matrices for Hidden Markov Models," *ICASSP 1998* (abstract).

Gollan et al., "Cross Domain Automatic Transcription on the TC-STAR EPPS Corpus," *ICASSP 2005*.

Hurst, "Indexing, Searching, and Skimming of Multimedia Documents Containing Recorded Lectures and Live Presentations," 2003, *In Proc. of ACM Multimedia*, pp. 1-2.

Janin et al., "The ICSI Meeting Project: Resources and Research," *Proc. of the ICASSP Meeting Recognition Workshop*, Montreal, Canada, 2004.

Kashioka, "Translation unit concerning timing of simultaneous translation" *LREC-2002: Third International Conference on Language Resources and Evaluation*, May 27-Jun. 2, 2002, Las Palmas de Gran Canaria, Spain, pp. 142-146.

Knight et al., "Machine Transliteration," Association for Computational Linguistics, 1998.

Koehm, "Europarl: A Multilingual Corpus for Evaluation of Machine Translation," *Info. Sci. Inst. U. of S. CA*, 2002.

Koehn et al., "Moses: Open Source Toolkit for Statistical Machine Translation," *Proc. of the ACL 2007 Demo and Poster Sessions*, Jun. 2007, pp. 177-180, Prague.

Koehn et al., "Open Source Toolkit for Statistical Machine Translation: Factored Translation Models and Confusion Network Decoding," Sep. 2007, one hundred two pages.

Köhler et al, "Rapid porting of ASR-systems to mobile devices," *Proc. of the 9th European Conference on Speech Communication and Technology*, Sep. 2005, pp. 233-236.

Lafferty et al., "Conditional Random Fiels: Probabilistic Models for Segmenting and Labeling Sequence Data," http://www.cis.upenn.edu-pereira/papers/crf.pdf, 2001.

Lamel et al., "The Translanguage English Database (TED)," *ICSLP*, vol. LDC2002S04, 1994 (abstract).

Lane, Ian R. et al., "Class-based Statistical Machine Translation for Field Maintainable Speech-to-Speech Translation," INTERSPEECH, Sep. 22, 2008, pp. 2362-2365, http://isl.ira.uka.de/fileadmin/publication-files/851_ISO81131.pdf.

Leggetter et al., "Maximum Likelihood Linear Regression for Speaker Adaptation of Continuous Density Hidden Markov Models," *Computer Speech & Lang.*, vol. 9(2), 1995 (abstract).

Mangu et al., "Finding Consensus Among Words: Lattice-Based Word Error Minimization," *EUROSPEECH*, 1999.

Matusov et al, "Evaluating Machine Translation Output with Automatic Sentence Segmentation," *Proc. of IWSLT 2005*, pp. 148-154, Oct. 2005.

Metze et al. "The Nespole! Speech-To-Speech Translation System," *Proceeding of HLT 2002, Second International Conference on Human Language Technology Research*, San Francisco, 2002.

Nanjo et al, "Language Model and Speaking Rate Adaptation for Spontaneous Presentation Speech Recognition," *IEEE Transactions of Speech and Audio Processing*, Jul. 2004, vol. 12, No. 4, pp. 391-400.

Narayanan, S. et al., "Transonics: A Speech to Speech System for English-Persian Interactions," *Automatic Speech Recognition and Understanding, 2003. ASRU 2003, 2003 IEEE Workshop on St. Thomas, VI, USA*, Nov. 30-Dec. 3, 2003. Piscataway, NJ, USA, IEEE, Nov. 30, 2003, pp. 670-675.

Och et al., "A Systematic Comparison of Various Statisitical Alignment Methods," Association for Computational Linguistics, 2003.

Och et al., "Improved Alignment Models for Statistical Machine Translation," http://www.aclweb.org/ anthology-new/W/W99/W99-0604.pdf, 1999.

Okuma, Hideo et al., "Introducing Translation Dictionary Into Phrase-based SMT," *Proc. Machine Translation Summit XI*, Sep. 10, 2007-Sep. 14, 2007, pp. 361-368, http://www.mt-archive.info/MTS-2007-Okuma.pdf.

Olszewski, et al., "Highly Directional Multi-Beam Audio Loudspeaker,"*INTERSPEECH 2006* (abstract).

Papineni et al., "Bleu: A Method for Automatic Evaluation of Machine Translation," *Proceedings of the 40th Annual Meeting of the Association for Computational Linguistics*, Jul. 2002, pp. 311-318.

Papineni et al., "Bleu: A Method for Automatic Evaluation of Machine Translation," *IBM Research Report, RC22176 (W0I09-022)*, Sep. 17, 2001.

Paulik et al, "Document driven machine translation enhanced ASR," *European Conference on Speech Communication and Technology, Interspeech*, Sep. 2005, pp. 1-4.

(56) References Cited

OTHER PUBLICATIONS

PCT International Search Report and Written Opinion, PCT Application No. PCT/US2011/021530, Mar. 28, 2011, ten pages.
PCT International Search Report and Written Opinion, PCT Application No. PCT/US2009/040677, Jul. 20, 2009, eight pages.
Soltau et al., "A One-Pass Decoder Based on Polymorphic Linguistic Context Assignment," *Automatic Speech Recognition and Understanding*, 2001 (abstract).
Stolcke, "SRILM—An Extensible Language Modeling Toolkit," Speech Technology and Research Laboratory, SRI International, Menlo Park, CA, 2002.
Stolcke, A., "SRILM—An Extensible Language Modeling Toolkit," http://www.speech.sri.com/cgi-bin/run-distill?papers/icslp2002-srilm.ps.gz, 2002.
Stuker et al., "The ISL TC-STAR Spring 2006 ASR Evaluation Systems," *TC-STAR Speech-to-Speech Translation Workshop*, Spain, 2006.
Suhm et al., "Towards Beder Language Models for Spontaneous Speech," 1994, Carnegie Mellon University, four pages.
TC-STAR, "Technologies and Corpora for Speech-to-Speech Translation," 2004.
United States Office Action, U.S. Appl. No. 13/008,346, Sep. 18, 2013, twenty-one pages.
Vogel et al, "The ISL statistical translation system for spoken language translation," *Proc. of the International Workshop on Spoken Language Translation*, Kyoto, Japan, 2004, pp. 65-72.
Waibel et al., "Computers in the Human Interaction Loop," *5th International Workshop on Image Analysis for Multimedia Interactive Services*, Lisbon 2004.
www.ldc.upenn.edu, Linguistic Data Consortium, Nov. 5, 2007.
www.ssli.ee.washington.edu/projects/ears/WebData/web_data_collection.html, Web Data for Language Modeling, Nov. 5, 2007.
Yamada et al., "A Decoder for Syntax-Based Statistical MT," *Proceedings of the 40th Annual Meeting of the Association for Computational Linguistics*, Jul. 2002, pp. 303-310.
Yarwsky et al., "Inducing Multilingual Text Analysis Tools Via Robust Projections Across Algined Corpora," http://delivery.acm.org.10.1145.1080000/1072187/p35-yarowsky.pdf., 2001.
Zhao et al., "A Log-Linear Block Transliteration Model Based on Bi-Stream HMMS," *Proceedings of NAACL HLT*, 2007, pp. 364-371.
Asadi, A. et al., "Automatic Modeling for Adding New Words to a Large-Vocabulary Continuous Speech Recognition System," International Conference on Acoustics, Speech, and Signal Processing, 1991, ICASSP-91, IEEE, pp. 305-308.
Collins, M. "Parameter Estimation for Statistical Parsing Models: Theory and Practice of Distribution-Free Methods," *New Developments in Parsing Technology*, Chapter 2, pp. 19-55, 2004, H. Bunt et al. (eds.), Kluwer Academic Publishers, Dordrecht, The Netherlands.
International Preliminary Report on Patentability, PCT/US2011/021530, Aug. 2, 2012, 9 pages.
Rao et al., "Improving Spoken Language Translation by Automatic Disfluency Removal: Evidence from Conversational Speech Transcripts," Machine Translation Summit XI, Copenhagen, Denmark, Oct. 9, 2007, 5 pages.
Waibel, et al., "Class-Based Statistical Machine Translation for Filed Maintainable Speech-to-Speech Translation," InterSpeech 2008, Brisbane, Australia, Sep. 22, 2008, 4 pages.
Zhang, Y. et al., "PanDoRA: A Large-scale Two-way Statistical Machine Translation System for Hand-held Devices," *Proceedings of MT Summit XI*, Sep. 10-14, 2007, Copenhagen, Denmark, eight pages.
United States Office Action, U.S. Appl. No. 13/008,346, Mar. 1, 2013, 29 pages.

\* cited by examiner

SPEECH TRANSLATION WITH BACK-CHANNELING CUES

CROSS REFERENCE TO RELATED APPLICATIONS

The present application is a continuation in part of U.S. Nonprovisional patent application Ser. No. 12/424,311 filed on Apr. 15, 2009, and U.S. Nonprovisional patent application Ser. No. 11/925,048 filed on Oct. 26, 2007.

BACKGROUND OF THE INVENTION

1. Field of the Invention

The present invention modified and extends patent filing on "System for Maintaining Speech-to-Speech Translation in the Field" and is directed generally at making speech-to-speech translation systems even more effective and user friendly for cross-lingual communication. More particularly, the extended methods disclosed in this CIP enable non-expert users to improve and modify the coverage and usage of their system in the field and to maximize the usefulness for effective communication in the field, without requiring linguistic or technical knowledge or expertise.

2. Description of the Invention Background

Speech Translation systems have achieved a level of performance that now makes effective speech translation in broad popular use a reality, and permits its use on small portable platforms such as laptop computers, PDA's and mobile telephones. As such, it is impractical to send speech translation systems back to the developer every time errors occur, vocabulary items are missing. Similarly, field situations dictate, that a user must be able to deal with errors quickly and effectively, and that effective communication is supported through the device, however, imperfect its performance.

SUMMARY OF THE INVENTION

In the following, we disclose several extensions to an apparatus for speech translation that improve the effectiveness of communication, and we provide a detailed description of their operation. We will make reference to the original patent filing, which describes an apparatus for speech translation capable of repairing errors and expanding its vocabulary. The disclosed methods improve the ease by which common, linguistically untrained users can better recover from errors, extend and customize the language coverage of their speech translation device and increase the speed of effective communication. We propose the following important and novel methods:

Speech Translation Quick Stop by Shaking
Correction of Pronunciations by way of Pseudo Phonetics
Speech Translation Favorites
Speech Translation Modes (Rude, Informal, Commanding, Local Dialect, . . . )
Smaller Dictionary based on User Repair and Boosting
Language Identification for Single Action Speech Translators
Language Learning based on Speech Translation Dialogs
Speech Translation from Telephone Conversation
Targeted Ads based on Recognized and Translated Speech
Perfect Listener Backchanneling based on Speech
Web Presentation based on Speech

DETAILED DESCRIPTION

The description of the proposed methods builds on the prior filed patent applications relating to Maintaining Speech-to-Speech Translation in the Field. In embodiments, the applications disclose methods for overriding the updating of the vocabulary of a speech translation system for translating a first language into a second language including written and spoken words. The system and methods comprise adding a new word in the first language to a first recognition lexicon of the first language; associating a description with the new word, wherein the description contains pronunciation and word class information; updating the new word and the description in a first machine translation module associated with the first language, wherein the first machine translation module contains a first tagging module, a first translation model and a first language module, and is configured to translate the new word to a corresponding translated word in the second language, wherein the updating is aborted to remove an hypotheses or partial hypotheses that may have already been output; and resetting the system to accept a new input.

Quick Abort

No speech recognition and translation device will ever deliver perfect performance. Thus error handling becomes a critical part of delivering fast and effective speech communication. Errors are problematic only, if they cannot be aborted quickly, corrected quickly and system performance improve (learn) from the correction. A speech translation device performs several tasks in sequence: speech recognition, machine translation, and text-to-speech synthesis in the new target language. Typically each of these steps is handled by system processes responsible for each of these steps. Each of these components can be launched in sequence or are often launched in parallel in a pipelined fashion to save overall processing time. Thus the processes are launched asynchronously in parallel, and often run already before the user actually finishes speaking. If erroneous input is received (a user misspeaks or system components produce erroneous output), a user typically has to wait till the full end-to-end speech translation completed, leading to unnecessary delays and confusion when the translated sentence is non-sensical.

If a user realizes that he has misspoken, or if erroneous word hypotheses emerge from the recognition engine (sometimes incrementally), a user would rather like to quickly stop the entire process and start over, without delay. Traditionally, such aborting action was not possible at all, or if implemented, required keystrokes or mouse clicks that command the system and its components to stop its component processes. In a mobile environment, even such keystrokes and mouse-clicks are bothersome and time consuming, when every second counts to get a point across in a multilingual dialog situation.

In the present invention, we disclose a method to perform this aborting action more swiftly. We introduce into the correction module a abort action, which instantaneously Aborts the ASR, MT and TTS processes that may already been running
Wipes any hypotheses or partial hypotheses that may have already been output
Resets the system to accept a new input In our invention, this abort action has to be accepted by a user interface input method that is quick and easy to use and access by the user during dialog. We choose a shake of the wrist as an input action that is swift and effective in a dialog action while holding a speech translation device in the hand, and it avoids any other keyboard or touch screen input.

To capture the wrist action, we use accelerometers that are already provided by some hardware manufacturers. Alternatively, we may use vision based sensing of rapid movement as features to classify an shaking action.

As an alternative aborting action, we may use the record button itself, which immediately terminates all ongoing previous processes and accepts a new input. In embodiments, the invention provides:

- Abort speech translation subcomponents altogether with one immediate command
- Method to abort speech translation processes with shake of the wrist
- Method to abort speech translation processes by pressing the record button
- Indicating the aborting action acoustically with a crumbling noise, or other sound icon.

Correction of Pronunciations by Way of Pseudo Phonetics

We have previously disclosed a method for adding new words to the components of a speech translation device by way of certain word classes that provide a mechanism for adding and subtracting names to a list of words that belong to this class (e.g., city names, person names, etc.). In this disclosure, the system automatically attempts to fill all necessary parametric information for the word so it can be properly recognized, translated and pronounced in its intended context meaning and environment. For this the user selects the word class that the word belongs to (e.g. city name, or person's last name, etc.). The system also automatically produces a phonetic transcriptions of the word that tells the recognition and synthesis modules how the word is pronounced in both of the speech translator's languages. As disclosed previously these automatic phonetic transcriptions are performed by a letter-to-sound transcription module that uses handwritten or automatically learned acoustic-phonetic mapping rules or mapping functions to generate the phonetic string.

For example:
a textual input of the name: "Pittsburgh"
would generate the phonetic string: "P I T S B ER G"

Now, letter-to-sound rules, whether learned or hand-written will never be perfect and may produce errorful transcriptions, particularly when foreign names are pronounced in unusual ways, i.e. in ways that deviate from normal English pronunciation rules.

Example: "Silvio" would be pronounced as "S I L V AY O"

To permit proper handling, therefore, the user should be given the possibility to modify or to correct the phonetic transcription. In our prior disclosure this was done by providing the user with access to the phonetic string as proposed by the automatic letter-to-sound rules, and make it user editable. In this manner, the user could enter a phonetic transcription of the new desired word by themselves.

Many linguistically untrained users, however, do not know how to write a phonetic transcription in standardized IPA (International Phonetic Alphabet) notation, and thus would not be able to enter new words easily. A more flexible user friendly mechanism is therefore devised that provides a more intuitive method. We insert letter-to-sound conversion and synthesis in the user editable phonetic transcription, thereby enabling the user to enter the phonetic transcript orthographically, that is, as a spelling of that pronunciation. On the User Interface, the user is instructed to enter it under "Pronounced As". Thus in our example above, the name "Silvio" would be entered listed orthographically as "Silvio" and we may enter it under "Pronounced As" as "S I L V Y 0". Internally then, the letter-to-sound generator produces a phonetic string for this new modified orthography in the hope that it matches the intended phonetic transcription. The user can verify this match intuitively by listening to it. Next to the text string for "Pronounced As", the user interface provides a play back button, which permits a user to play a synthetic rendering of the modified pseudo phonetic spelling. Internally, this is realized by running the pseudo-phonetic spelling of the name (as entered or edited in the "Pronounced As" field) through the letter-to-sound conversion module which generates the actual phonetic string in IPA (or other standardized phonetic) notation. Subsequently, the speech synthesis module is run to generate the audible synthetic pronunciation of that phonetic string. If the user is not satisfied with the way it sounds, he/she can iterate by modifying the pseudo-phonetic orthographic transcription until the desired pronunciation is achieved. When it is, the systems saves the phonetic transcript obtained in that manner along with the orthographic spelling of the word for the new added word. In examples, the system provides Pseudo-phonetic Entry of Pronunciations for New Names in the Customization Module of a Fieldable Speech-to-speech Translator Speech Translation Favorites Frequently, users may say the same sentence repeatedly in a field situation and it would not be necessary to respeak the same sentences over and over again. We introduce a the concept of a speech translation favorites list, which stores frequently used phrases for rapid playback. This favorites differs from a plain list or phrase book in one most important aspect: it gets filled and built by the speech translation device, and thus, does not require a bilingual speaker to be on hand to know the correct translation to a term or phrase. Thus we insert into our fieldable device a favorites module that has the following functions:

Copy both a.) original spoken sentence and b.) translation from the speech translation interaction window to a favorites list Provide editing capability to the newly copied bilingual sentence pair, so a user can modify both input and output string Provide the ability to play back the target language side of the added sentence pair by applying the synthesis module With the favorites list in place, a user can simply play back various accumulated phrases from the favorites list, without speaking them first. This saves time in field situations. At the same time the favorites list provides the full flexibility of a full two-way speech-to-speech translator since it does not require a linguistically trained expert knowledgeable of both languages to build such a list. A customized list can be built by the user in the field and on the fly. In examples, the invention can copy translations the from Speech-to-Speech Translator for rapid deployment phrase generation. Novelty and uniqueness is that the phrases are generated by translator, and thus not preprogrammed but can be customized and prepared by the user. Quick play back of such prepared phrases are faster and allow for rapid play/response in the field.

Speech Translation Modes

Even when performing speech translation limited to one language pair, there are variations in language use depending on social situation, dialect, regional expression and context that are typically not differentiated by a standardized speech translator. Yet, it is in many ways critically important to separate them to achieve socially appropriate results. Thus, the same user may speak formally in a formal context at work, in an informal colloquial manner at home with his/her family, and use slang at a party with friends. Similarly, there may be situational differences, such as authoritative or submissive speaking, depending on whether the device is used by a police/military officer on duty or as a clerk in a department store.

In addition to language choices, we introduce a language "mode". This mode operates like a switch that switches the device into the appropriate speaking mode, and modifies/conditions the modeling of several system subcomponents accordingly. Two mechanisms are employed: Filters and Mode-Dependent Models Filter Method: in this method we use a mode switch only to filter or enable certain recognitions and translations that are otherwise internally processed and understood, but potentially not produced. A case in point for this procedure is a rude/strong language mode which can be enabled or disabled. This is important, so as not to inadvertently produce strong language, when it is not intended, yet produce or handle it in a culturally appropriate manner when it is intended by the user. Using a mode thus means enabling/disabling a filter that removes or processes certain expressions that might be considered as offensive. The filter is implemented by a text processor that performs certain string matches for lexical items that are potentially rude or offensive language. If the text processor encounters such expressions, it replaces them by a beeping sound and consequently also produces a bleep in the target language, if the filter is enabled. If the strong-language filter is disabled, the expression is processed and translated and produced. Note that the filter method is a surface form method, that builds on a full processing of the content, that is, it recognizes and translates the expressions in question, and then removes or filters them, depending on user selection.

Mode dependent models: We also introduce methods that are appropriately modulating the operation of various subcomponents of a system to produce the desired result in translation. If a user speaks informally for example, such informality might be expressed in different ways in the other language. Hence, a system is trained using such conditioning modes as conditions in their training to render the correct expression more likely in a certain situation. Mode dependent models include the translation modules, the language models of the recognizer and the translator, as well as prosodic parameters and voices of the synthesis to render the pronunciation of the translation more appropriate based on mode. In examples, the invention provides:

Filters of Expressions, e.g. the rude filter

Mode dependent speech translation models, they condition the operation of the recognition, translation and synthesis components to operate in a contextually more appropriate fashion based on user intent and situation.

Modes include: informal/formal language, strong/rude vs. non-rude language, levels of emotion, commanding vs. submissive language and tone, Smaller Dictionary Based on User Repair and Boosting To run on small devices it is frequently not possible to carry a large dictionary of words that provides a reasonable good coverage or a language. The proposed method circumvents this problem by building initial systems with considerably smaller dictionaries for efficiency. Coverage by contrast is then generally a problem as many common words may not be available in the systems dictionaries. To recover generality/robustness without paying the price of more memory requirements, a method is disclosed that can achieve a tighter more targeted dictionary and language model through personalization and customization of the system by the user. In this manner, the system design sacrifices only some generality of vocabularies of an overall user population, but retains the generality of vocabulary use by the individual owner and user of the device. Prior research shows, for example, that discussions between human conversant around a certain topic of interest will generally only have vocabulary sizes of about 4,000 words, while general speech translation systems may have vocabulary sizes of 40,000 words or more (in English).

In the disclosed method, the system would therefore be delivered in a state where vocabulary is more severely curtailed than in larger more general systems and thus be more parsimonious in memory use than a larger system. With vocabularies of 4,000-10,000 words, search trees, language models and pronunciation dictionaries can be reduced dramatically over vocabulary sizes of 40,000 or more. In this case, however, we will generally observe a larger mismatch between the vocabulary of the system and the desired vocabulary of the user, and out-of-vocabulary words will appear in the spoken utterances. Now, the proposed system will also come with a large background dictionary, and large pre-trained language models. This is possible without loss of advantage, since the large dictionaries and language models can be stored in flash memories that are typically available in abundance (e.g. to store music, pictures, etc.) on modern mobile phones. When an out-of-vocabulary item occurs the system now provides an easy method to correct the consequential misrecognition by various corrective mechanisms (previously disclosed). Based on the corrective action, the system now knows the user's desired word, and the system can now compare the corrected word with its internal dictionary to determine if the corrected word was just misrecognized or if it was in fact not in the dictionary. If the word was an out-of-vocabulary item, the system performs one more check, to attempt to determine if the word was a named entity to be handled by way of named entity word classes (First Name, Last Name, City Name, etc.) used in the field customization module (already disclosed), or if it is in fact a missing open class word, such as nouns, verbs or adjectives. This determination is done by named entity tagging run on the sentence as it is presented after correction, and by checking in the background dictionary of the corrected new word appears in the background dictionary as an open-class word. Now, if the word appears in the background dictionary and the word is not a named-entity, its pronunciation entry and its pre-trained language model entry is copied from the background models and merged into the running recognition and translation models and search trees. Appropriate translations are also extracted from background phrase tables into the running speech translator. After this merging has been done, the new word will have been incorporated into the running recognition dictionary, recognition and translation language models and translation models. The system is now ready to accept the new added word for future utterances. With continuing customization the system will continue to improve and provide the user with a vocabulary that is optimized in scope, providing good coverage for his/her needs in the field, while minimal memory requirements. In examples, the invention includes:

User customization of vocabularies that are not named-entities for use in systems with small memory.

User customizable dynamic vocabulary management for open class words (not only named entities) in speech translators Language ID During Speech Translation In current speech translators a user has to select a record button that pertains to the language of the speaker/user. In speech translators for two-way dialogs, this means that at least two record buttons have to be provided for the two possible language inputs. This, unfortunately, wastes screen real estate and can lead to user errors when the wrong button is pushed. In the interest of simplification, we propose to eliminate this source of user confusion, but providing automatic language identification first and then produce translation in the other language, no matter which language was spoken. In examples, the invention includes speech translation using LID, this avoids having multiple buttons and activations for different languages.

Language Learning from Speech Translation

Speech Translators today are aiming to provide two-way speech dialog communication for people who don't speak each other's languages. Frequently, though, a user may wish to learn another person's language themselves as well. To provide such possibilities, we expand the speech translator function by a language learning function. Contrary to other language learning software products, this language learner has a speech translator for language support and can provide customized language learning drills that are responding to specific user language learning interest, as it can observe a user's language usage during speech translation dialog use. Thus, a user may converse with other individuals through use of the speech translator over a period of time, and then gradually attempt to learn for him/herself key concepts, vocabularies, language constructs that he/she often uses. Thus a language learning drill can be personalized and targeted much more concretely at the specific language needs of an individual user than static impersonal language learning books or software would.

To achieve this functionality, our speech translator is expanded by a language learning module. This module observes (logs) the sentences a user has uttered over a period of time. Based on a variable window of logged user utterances, the system now builds a learning profile of typical sentence constructs and vocabularies. These will include typical syntactic constructs, as well as useful vocabularies as determined by word frequencies (commonality of words) and semantic word clustering (proximity to topic of interest). Based on this information, the system now constructs a language learning drill, that the user can invoke at will (when he/she has time) to learn.

In parallel to the automatic construction of language learning drills, the user is also provided with direct control over his/her language learning drills: each sentence spoken in the speech translator can also be directly copied to the learning module, so that its words and expressions appear in the subsequent learning drills. In examples, the invention includes (Human) language learning support based on speech translators. They allow a targeted, personalized language learning software support, that builds language learning drills based on a user's speech translation usage. Words that were required and used in actual operation are presented for learning.

Speech Translation from Telephone Conversation

In the previous disclosures, we have considered speech translators for portable devices such as smart phones and PDA's. In all these deployments, the speech translator acts as a consecutive interpreter between two people in a face to face dialog situation.

We expand this notion, by using a speech translator on a telephone as an interpreter between people speaking over that telephone with each other.

To achieve this functionality, we modify the user interface. Speech is now arriving via the microphone of the user of the telephone as well as by the signal transmitted over the telephone line and is recognized and translated.

Based on this system configuration, Recognition and Translation can now be carried out in two different manners: as consecutive translation or as simultaneous translation. In the former, the user pushes a record button, as before, to accept a speech utterance either of his/her own, or from the speaker on the other end of the telephone connection. This utterance is then recognized and translated. In the case of simultaneous translation, no button is pushed but the systems attempts to translate everything on the channel. Sentences are then segmented automatically by speech segmentation and speech translation output is presented concurrently to either speaker speaking. Speech translation output is then provided either acoustically (overlaying the original speaker's speech) or visually, by displaying text on a user's telephone device. In examples, the invention includes speech Translator configured to translate speech of people conversant with each other over a telephone (not face-to-face)

Information Extraction Based on Recognized and Translated Speech

Speech Recognizers and Translators operating on a smart phone can also provide information on a user's speech content. We propose to expand the speech recognizer and translator to extract topical information from two conversants' speech. Such information is then used to seek relevant related information on the interne. Such information is then presented to the user.

There are multiple uses of such conversation enabled information extraction. It could be used to provide more targeted advertising (perhaps in return for cheaper calling rates). I could also be used to provide the user with helpful supporting information (for example, calling up flight schedules, hotel availabilities & rates, recalling a person's contact details, etc.) when a conversation mentions certain topics, people, places, or activities. This information can also be recalled bi-lingually from sources in either of the languages handled by the speech translator. In examples, the invention includes extraction of information based on the content recognized and translated during speech recognition and translation of conversations.

Back-channeling Based on Speech Recognition and Translation

In addition to processing the word sequence obtained from a speech recognizer and translator and extracting information based on such a word sequence, we can also use prosodic cues to produce helpful or entertaining back-channeling cues. A back-channel cue is a confirmatory remark by which one dialog partner signals to the other that he/she is listening, approving, supporting, disagreeing, etc. In this manner, one person may say "u-huh", "hmm", "mmm", "yes", "right", and so on, to signal to the other that they are still online and listening. Sometimes such back-channeling remarks also include supportive and approving remarks, such as "you are so right", "that's a good one", "absolutely", or disapproving, doubting remarks, such as "well . . . ", "really?", and so on.

In this invention, we propose to model these cues, for speech recognizers and translators, so that a system automatically produces them based on user input. This becomes useful in speech translators, since there is typically a delay between a speaker's utterance, and the production of the translation output, thus leading to lack of confirmation by the listener. Automatic back-channeling could thus produce confirmatory cues, aimed at the speaker, to signal that communication is working and uninterrupted. Aside from aiding the communication process, automatic back-channeling can also produce an entertaining effect. We propose to expand this back-channeling concept to include approving or disapproving remarks to the purpose of entertainment. The back-channeler is now producing approving remarks targeted at various user groups to make them feel good: "you are so great", "why didn't I think of that?", etc.

To achieve this functionality, the system uses in addition or apart from speech recognition, the extraction of prosodic cues, such as pauses, pitch contours, intensity, etc. The prosodic module attempts to determine suitable break-points to insert back-channel cues and/or confirmatory remarks. The break-points are determined by pauses, or by pitch deviations that indicate the end of an assertion or remark. A back-channel cue is then generated. The sensitivity of the break-point detection can also be controlled, leading to a more or less proliferous back-channeler. In examples, the invention includes:

Back-Channeling to support simultaneous speech translation. Confirmatory cues are produced to signal to a speaker that the system is still listening and producing output.

Back-Channeling as an entertaining device. Speech recognizers and translators produce back-channels that are approving or disapproving to encourage or discourage a speaker. The list of confirmatory remarks is targeted toward a specific user group (Husband, Wife, Friend, Boss, etc.)

Triggers for Back-Channeling are conditioned on prosodic cues that indicate certain speaking genres (chatting, arguing, lecturing, etc.) or discourse acts (question, statement, assertion, etc.)

Control of Back-Channeler Sensitivity

Web Presentation Based on Speech

A simultaneous speech translator has so far been presented as a stand-alone speech translation device that produces output from a microphone speech input and output is typically presented via a overhead projector, headphones, targeted audio devices, or heads-up displays. In this invention, we describe an internet based presentation. While a lecturer makes a presentation, speech is accepted on his computer and recognized and translated either on his own computer, or on a remote computing server. The server produces output in another language that is sent to a web site that is accessible by the audience. Listeners therefore can follow a simultaneous translation over their personal computing devices, including PC's laptops, smartphones, etc., by connecting to the server. Thus lecture translation is disseminated by way of the internet without requiring any presentation tools for the simultaneous translation. In examples, the invention includes presentation server of the output of a simultaneous lecture recognition and translation service over the internet. The presentation is recognized and translated and becomes instantly available for browsing and/or for listening to the simultaneous translation over the internet. Any internet browser on any listener's personal computing device, therefore, can be used to provide personalized access to the output.

What is claimed is:

1. A method of translating speech from a first language to a second language, the method comprising:
   recognizing speech by a speaker;
   identifying the speech by the speaker as being in the first language;
   initiating a translation of the speech in the first language, by a speech translation system, into the second language;
   recognizing, by the speech translation system, one or more prosodic cues in the speech in the first language, one or more of the prosodic cues being of a specific type of prosodic cue;
   responsive to recognizing the prosodic cues, producing a back-channel cue corresponding to the specific type of prosodic cue;
   providing, by the speech translation system, the produced back-channel cue to the speaker, the back-channel cue comprising an audible confirmation that initiation of the translation of the speech in the first language has occurred; and
   determining a translation result in the second language.

2. The method of claim 1, wherein the produced back-channel cue further confirms that the translation of speech in the first language is currently working and uninterrupted.

3. The method of claim 1, wherein the recognized one or more prosodic cues comprises a pause in the speech by the speaker, the produced back-channel cue confirming that the translation of speech is in progress.

4. The method of claim 3, wherein the recognizing by the speech translation system of the one or more prosodic cues comprising a pause in the speech by the speaker adjusts sensitivity for detection of a break point beginning the pause dependent on a speech setting for the speech by the speaker.

5. The method of claim 4, wherein the speech setting is adjustable based on input provided by the speaker.

6. The method of claim 1, wherein the one or more prosodic cues are selected from the group consisting of pauses, pitch contours, or intensity changes.

7. The method of claim 1, wherein the prosodic cues are selected from the group consisting of pauses and pitch contours.

8. A speech translation system, comprising:
   a processor;
   a speech recognition module that identifies sound comprising speech spoken in a first language by a speaker;
   a prosodic module that recognizes prosodic cues in the speech in the first language, one or more of the prosodic cues being of a specific type of prosodic cue;
   a speech synthesis module that produces, responsive to recognizing the prosodic cues, a back-channel cue corresponding to the specific type of prosodic cue and provides the produced back-channel cue to the speaker, the back-channel cue comprising an audible confirmation that initiation of the translation of the speech in the first language has occurred; and
   a translation module that translates and outputs, in a second language, the speech spoken in the first language by the speaker.

9. A computer program product comprising a non-transitory computer readable storage medium having instructions encoded thereon that, when executed by a processor, cause the processor to:
   recognize speech by a speaker;
   identify the speech by the speaker as being in the first language;
   initiate a translation of the speech in the first language, by a speech translation system, into the second language;
   recognize, by the speech translation system, one or more prosodic cues in the speech in the first language, one or more of the prosodic cues being of a specific type of prosodic cue;
   responsive to recognizing the prosodic cues, produce a back-channel cue corresponding to the specific type of prosodic cue;
   provide, by the speech translation system, the produced back-channel cue to the speaker, the back-channel cue comprising an audible confirmation that initiation of the translation of the speech in the first language has occurred; and
   determine a translation result in the second language.

10. The computer program product of claim 9, wherein the produced back-channel cue further confirms that the translation of speech in the first language is currently working and uninterrupted.

11. The computer program product of claim 9, wherein the recognized one or more prosodic cues comprises a pause in the speech by the speaker, the produced back-channel cue confirming that the translation of speech is in progress.

12. The computer program product of claim 11, wherein the recognizing by the speech translation system of the one or more prosodic cues comprising a pause in the speech by the speaker adjusts sensitivity for detection of a break point beginning the pause dependent on a speech setting for the speech by the speaker.

13. The computer program product of claim 9, wherein the one or more prosodic cues are selected from the group consisting of pauses, pitch contours, or intensity changes.

14. A method comprising:
   recognizing speech by a speaker;
   identifying the speech by the speaker as being in a first language;
   initiating a translation of the speech in the first language, by a speech translation system, into a second language;
   recognizing, by the speech translation system, one or more prosodic cues in the speech in the first language, one or more of the prosodic cues being of a specific type of prosodic cue;
   responsive to recognizing the prosodic cues, producing a back-channel cue corresponding to the specific type of prosodic cues;
   providing, responsive to recognizing a back-channel cue to the speaker, the back-channel cue comprising an audible confirmation that the speech translation system is ready to receive additional speech for translation;
   determining a translation result in the second language.

15. The method of claim 14, wherein the provided back-channel cue further confirms that the translation of speech in the first language is currently working and uninterrupted.

16. The method of claim 14, wherein the recognized one or more prosodic cues comprises a pause in the speech by the speaker, the provided back-channel cue confirming that the translation of speech is in progress.

17. The method of claim 16, wherein the recognizing by the speech translation system of the one or more prosodic cues comprising a pause in the speech by the speaker adjusts sensitivity for detection of a break point beginning the pause dependent on a speech setting for the speech by the speaker.

18. The method of claim 17, wherein the speech setting is adjustable based on input provided by the speaker.

19. The method of claim 14, wherein the one or more prosodic cues are selected from the group consisting of pauses, pitch contours, or and intensity changes.

20. The method of claim 17, wherein the prosodic cues are selected from the group consisting of pauses and pitch contours.

21. A computer program product comprising a non-transitory computer readable storage medium having instructions encoded thereon that, when executed by a processor, cause the processor to:
   recognizing speech by a speaker;
   identifying the speech by the speaker as being in a first language;
   initiating a translation of the speech in the first language, by a speech translation system, into a second language;
   recognizing, by the speech translation system, one or more prosodic cues in the speech in the first language, one or more of the prosodic cues being of a specific type of prosodic cue;
   responsive to recognizing the prosodic cues, producing a back-channel cue corresponding to the specific type of prosodic cues;
   providing, responsive to recognizing a back-channel cue to the speaker, the back-channel cue comprising an audible confirmation that the speech translation system is ready to receive additional speech for translation;
   determining a translation result in the second language.

22. The computer program product of claim 21, wherein the provided back-channel cue further confirms that the translation of speech in the first language is currently working and uninterrupted.

23. The computer program product of claim 21, wherein the recognized one or more prosodic cues comprises a pause in the speech by the speaker, the provided back-channel cue confirming that the translation of speech is in progress.

24. The computer program product of claim 21, wherein the recognizing by the speech translation system of the one or more prosodic cues comprising a pause in the speech by the speaker adjusts sensitivity for detection of a break point beginning the pause dependent on a speech setting for the speech by the speaker.

25. The computer program product of claim 21, wherein the one or more prosodic cues are selected from the group consisting of pauses, pitch contours, or intensity changes.

* * * * *

UNITED STATES PATENT AND TRADEMARK OFFICE
CERTIFICATE OF CORRECTION

PATENT NO. : 9,070,363 B2
APPLICATION NO. : 12/689042
DATED : June 30, 2015
INVENTOR(S) : Alexander Waibel et al.

Page 1 of 1

It is certified that error appears in the above-identified patent and that said Letters Patent is hereby corrected as shown below:

In the Claims:
Column 10, line 16, claim 6 replace "cuesare selected from the group consisting of pauses, pitch," with --cues are selected from the group consisting of pauses, pitch--.

Signed and Sealed this
Second Day of August, 2016

Michelle K. Lee
*Director of the United States Patent and Trademark Office*